United States Patent [19]

Thies

[11] 4,393,766
[45] Jul. 19, 1983

[54] BELT PRESS WITH HOSE-TYPE ACTUATOR

[75] Inventor: Peter Thies, Ennepetal-Voerde, Fed. Rep. of Germany

[73] Assignee: Wagener Schwelm GmbH & Co., Schwelm, Fed. Rep. of Germany

[21] Appl. No.: 286,670

[22] Filed: Jul. 24, 1981

[30] Foreign Application Priority Data

Jul. 26, 1980 [DE] Fed. Rep. of Germany ....... 3028400

[51] Int. Cl.³ .............................................. B30B 15/06
[52] U.S. Cl. ..................................... 100/99; 100/93 P; 100/258 A; 100/269 A; 100/270; 100/290; 100/295; 156/583.1
[58] Field of Search .................... 100/93 P, 269 A, 99, 100/258 A, 258 R, 270, 271, 290, 295; 156/580, 583.1; 425/406, 410, 384, 385, 394, 338, 343

[56] References Cited

U.S. PATENT DOCUMENTS

| 2,363,779 | 11/1944 | Duffy et al. | 100/269 A |
| 2,411,043 | 11/1946 | Klassen | 100/93 P |
| 3,808,968 | 5/1974 | Notin | 100/269 A X |

FOREIGN PATENT DOCUMENTS

| 2029853 | 1/1972 | Fed. Rep. of Germany | 100/93 P |
| 2248810 | 4/1974 | Fed. Rep. of Germany | 100/93 P |
| 14904 | of 1899 | United Kingdom | 100/269 A |

| 598766 | 3/1978 | U.S.S.R. | 156/583.1 |

Primary Examiner—Billy J. Wilhite
Attorney, Agent, or Firm—Karl F. Ross; Herbert Dubno

[57] ABSTRACT

A belt press comprises a plurality of upper and a plurality of lower traverses respectively having lower and upper traverse faces, upper and lower press platens carried on and between these traverses and having respective upper and lower platen faces respectively confronting the lower and upper traverse faces, and a hydraulic actuator for displacing these traverses toward each other and thereby pressing the platens against a belt engaged therebetween. The hydraulic actuator is engaged between one of the platen faces and the confronting traverse face and has a pressure plate bearing on the one platen face, a plurality of diametrally compressible but circumferentially unstretchable hydraulic hoses forming at least one substantially closed chamber and bearing in one direction in surface contact on the pressure plate and in the opposite direction in surface contact at least indirectly on the confronting traverse face, and a system for pressurizing this chamber. The hoses have in uncompressed condition a predetermined hose diameter but are partially flattened between the plate and the confronting traverse face so as to engage same in the above-described surface contact.

10 Claims, 6 Drawing Figures

BELT PRESS WITH HOSE-TYPE ACTUATOR

FIELD OF THE INVENTION

The present invention relates to a press. More particularly this invention concerns a press of the type used to repair belts or to join together belt sections into an annular belt.

BACKGROUND OF THE INVENTION

A belt press normally has a plurality of upper and a plurality of lower traverses respectively having lower and upper traverse faces with the traverses all parallel and each upper traverse lying above a respective lower traverse. Upper and lower heatable press platens are carried between these traverses and in turn have respective upper and lower platen faces respectively confronting the lower and upper traverse faces. Thus a belt to be pressed can be engaged between the platens. Mechanically actuated means including bolts is engaged between each lower traverse and the respective upper traverse for displacing the traverses toward each other and thereby pressing the platens against the belt between them. During a pressing operation the platens bend somewhat from their normally planar shape, as the platens are not made stiff enough to avoid such bending in order to cut down on equipment weight.

Normally some sort of pressing system is provided between the movable platen and the respective traverses. Such a system normally comprises an array of screw-type or hydraulic jacks engaged between this movable platen and the respective traverses, with a row of such jacks between each traverse and the respective movable platen.

When hydraulic jacks are employed, they must be actuated at very high pressure and in a very careful manner so as to bring as even a force as possible to bear on the belt clamped between the press platens. The pressure employed is normally very large, in the neighborhood of several hundred atmospheres. What is more it is necessary to cut out the traverses to accomodate these jacks, substantially weakening the traverses which are in any case made a light as possible to make transport of the machine possible.

It has been suggested to employ pressurizable bladders or cushions as hydraulic actuating means. Such a solution has not worked because no such cushion has been found that can withstand the pressure necessary in a belt press. If pressurized sufficiently such a bladder will frequently blow out or burst laterally.

OBJECTS OF THE INVENTION

It is therefore an object of the present invention to provide an improved belt press.

Another object is the provision of such a press which is substantially easier to operate than the prior-art such presses.

A further object is to provide a belt press wherein relatively even pressure can be brought to bear without using complex equipment.

SUMMARY OF THE INVENTION

These objects are attained according to the instant invention in a belt press comprising a plurality of upper and a plurality of lower traverses respectively having lower and upper traverse faces, upper and lower press platens carried on and between these traverses and having respective upper and lower platen faces respectively confronting the lower and upper traverse faces, and hydraulic actuating means for displacing these traverses toward each other and thereby pressing the platens against a belt engaged therebetween. According to this invention this hydraulic actuating means is engaged between one of the platen faces and the confronting traverse face and has a pressure plate bearing on the one platen face, a plurality of diametrally compressible but circumferentially unstretchable hydraulic hoses forming at least one substantially closed chamber and bearing in one direction in surface contact on the pressure plate and in the opposite direction in surface contact at least indirectly on the confronting traverse face, and means for pressurizing this chamber. The hoses have in uncompressed condition a predetermined hose diameter but are partially flattened between the plate and the confronting traverse face so as to engage same in the above-described surface contact.

In addition the system of the instant invention is provided with means for displacement of the plate toward and away from the confronting traverse face only through a distance substantially shorter than the hose diameter, and at least one bend-compensating element having a pair of nonparallel upper and lower surfaces and engaged between this hydraulic actuating means and one of the respective faces.

Since the hoses are flattened between the pressure plate and the traverse, or between the pressure plate and the platen surface, they will be securely held in place and will not be able to shift. Furthermore these hydraulic hoses can withstand enormous forces, more than enough to act as actuators for the belt press.

Thus the combination of the system of the instant invention using a hydraulic actuator plus a bend compensator insures that the movable press platen will be perfectly evenly loaded. Even if the mechanical actuating means at the ends of the traverses is unevenly actuated, the force transmitted to the movable press platen from the hydraulic actuator will be perfectly even. Since when fully loaded the bend compensator, whose surfaces are shaped to compensate for the amount of bend in the press at standard operating pressure, eliminates the effective bend of the traverses, the pressure will be uniform on the movable platen.

According to the instant invention, the cross-sectional area of said hoses of the actuating means is equal to between 70% and 80% of the cross-sectional area of the hoses in uncompressed condition.

In accordance with further features of this invention the hoses are all interconnected to form a single such chamber. The hoses can extend transverse to the traverses, or they can extend as pairs generally parallel to these traverses and be aligned thereunder.

The pressure plate is of thermally insulating material. Thus the often heat-sensitive hydraulic hoses used in the actuator are protected from the heat of the press platens. In addition the plates are each of U-section and laterally contain the respective hoses. Furthermore the hoses of each of the plates engage each other laterally. These hoses are normally of circular cross section and are formed of a filament-reinforced elastomer. Such construction is extremely durable and insures that the hoses remain relatively well contained so that they can be counted on not to bubble out between the pressure plate and traverse and fail.

It is possible to monitor the pressure the press is exerting by providing a pressure gauge for indicating the pressure in the hose chamber. Such a gauge gives an exact reading of the press pressure. If the chambers of the hoses or groups of hoses respectively associated with the individual traverses are separate, a single such gauge can be provided with a quick-disconnect coupling to allow it to be moved from group to group. Of course if all of the chambers are connected together, a single gauge is needed for all of the hoses.

DESCRIPTION OF THE DRAWING

The above and other features and advantages will become more readily apparent from the following, reference being made to the accompanying drawing in which.

SPECIFIC DESCRIPTION

Figure 1:
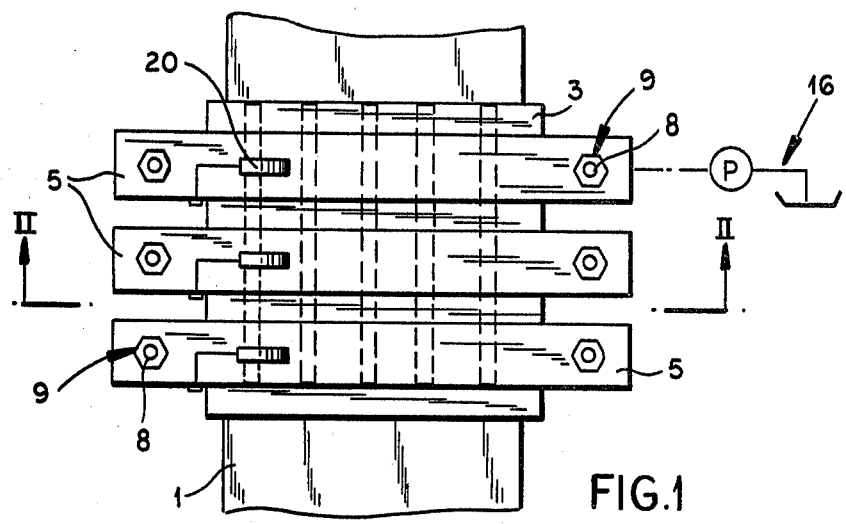
FIG. 1 is a top view of a press according to the instant invention.

As seen in FIG. 1 a press according to the instant invention for joining sections of or repairing a belt workpiece 1 having longitudinal cable reinforcement 2 has upper and lower press platens 3 and 4 sandwiched between upper and lower traverses 5 and 6. The platens 3 and 4 are flat and have planar surfaces and the traverses 5 and 6 are straight with similarly planar surfaces. Three sets of traverses 5 and 6 are provided, with the traverses extending parallel to one another. Upright tie bolts 8 have lower ends seated in the outer ends of the lower traverses 6 and upper ends passing through the outer ends of the upper traverses 5 and bearing down thereagainst by means of nuts 9.

Figure 2:
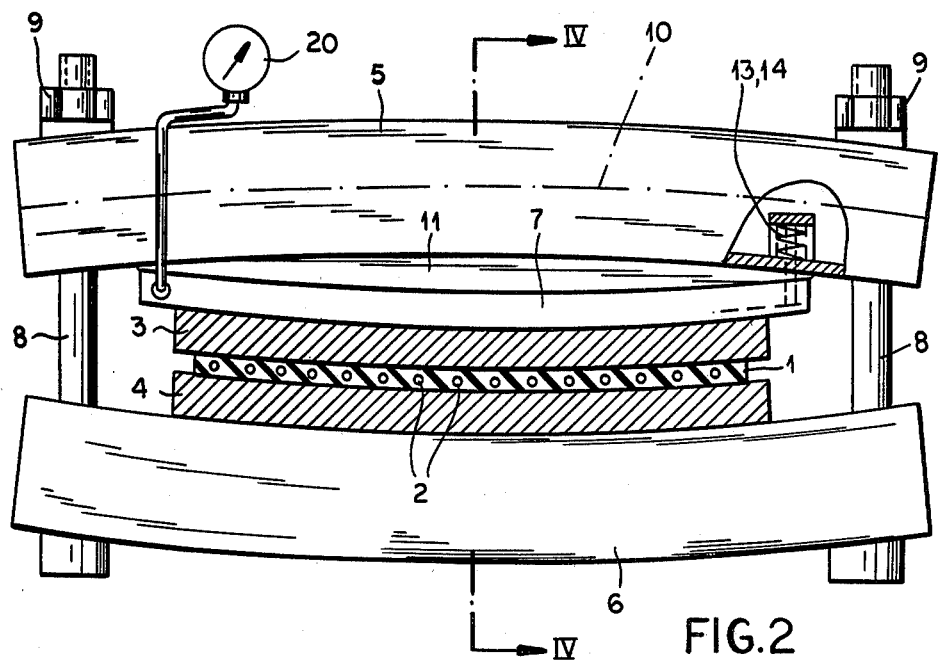
FIG. 2 is a section taken along line II—II of FIG. 1.

In normal use the traverses 5 and 6 bend. The extent of bend is indicated at bend line 10 which is shown in exaggerated form in FIG. 2, and which represents the shape a staight line would have when the press is operating, that is when substantial force is exerted urging the platens 3 and 4 vertically away from each other.

The upper traverses 5 bear via a bend-compensating element 11 and a hydraulic actuator 7 on the upper surface of the upper press platen 3, although this structure could be arranged differently, as between the lower platen 4 and the lower traverses 6 or with the compensator 11 between the actuator 7 and the respective platen 3 or 4.

Figure 4:
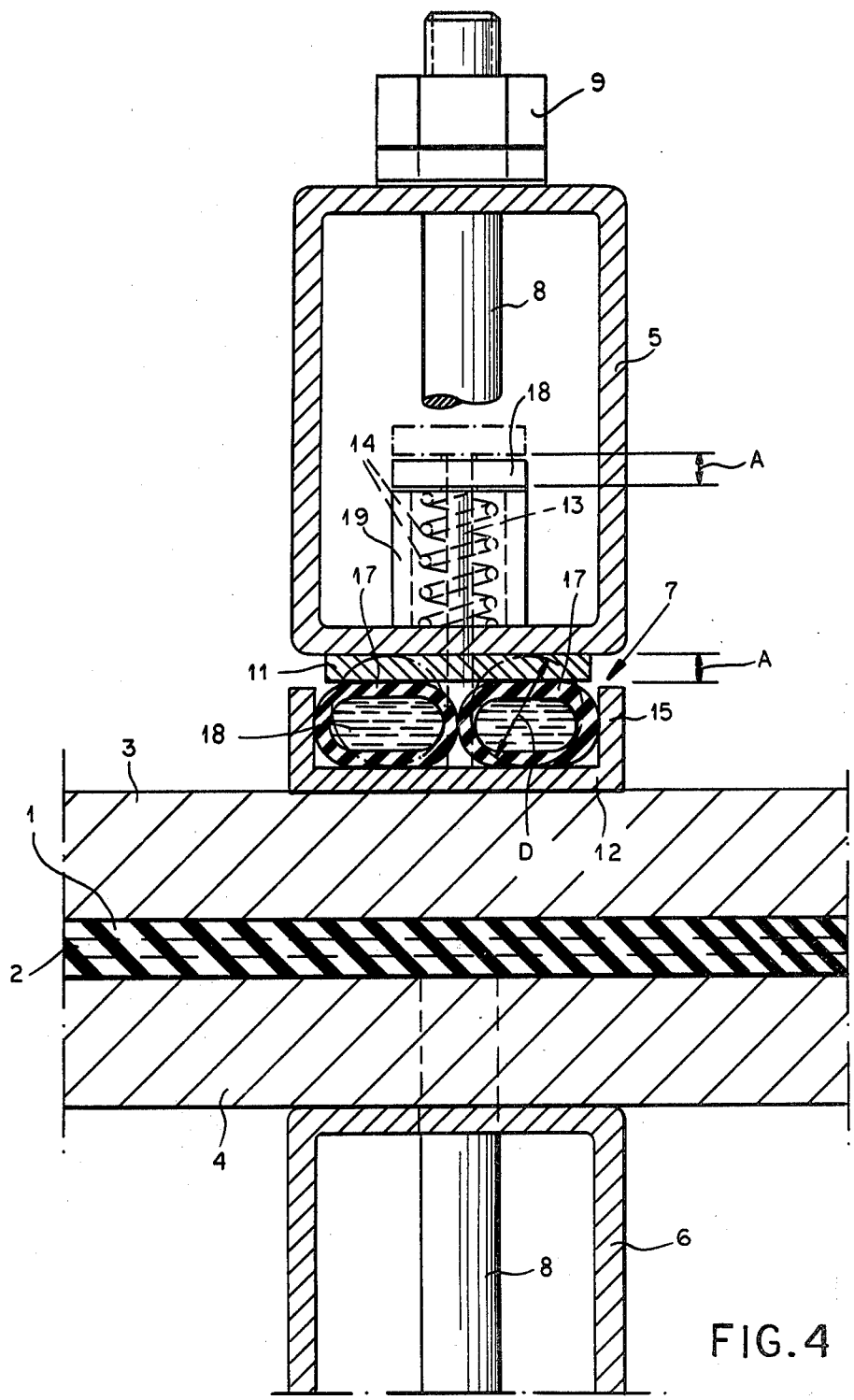
FIG. 4 is a section taken along line IV—IV of FIG. 2.
Figure 5:
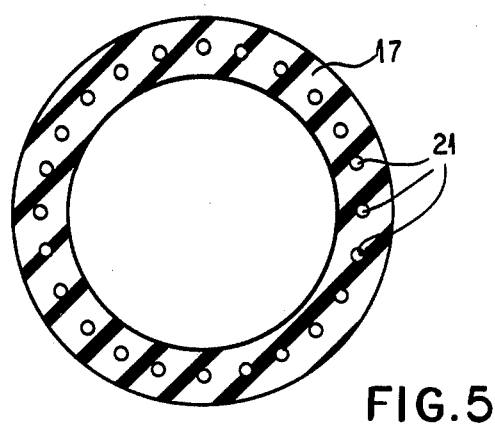
FIG. 5 is a large-scale cross-section through a detail of this invention.
Figure 6:
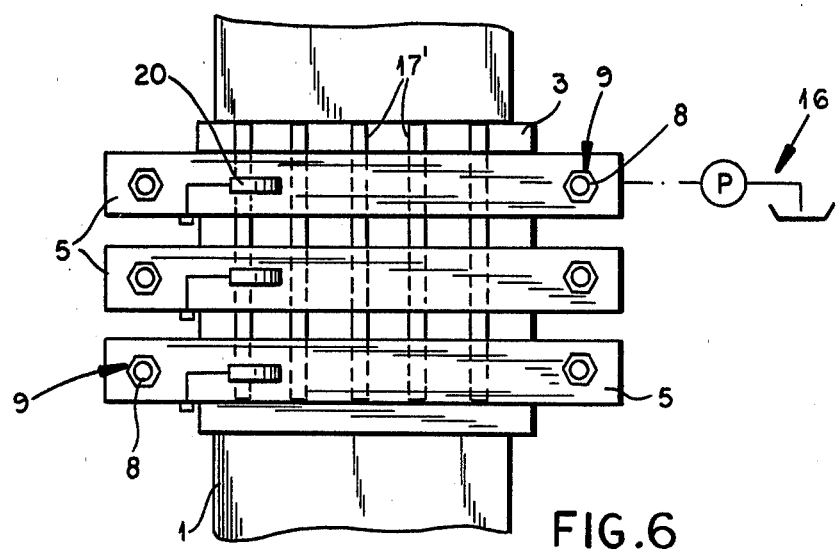
FIG. 6 is a view like FIG. 1 illustrating another system according to the invention.

As best shown in FIG. 4 this actuator 7 comprises a pair of hose sections 17 engaged between the upwardly extending flanges 15 of a rigid U-section pressure plate 12 of insulating material. These hose sections 17 are all connected together and to a source 16 of hydraulic fluid 18 under pressure (see FIG. 1) and are provided with reinforcement filaments as shown at 21 in FIG. 5. This source 16 can pressurize them all or by individual groups, one group per traverse. Here two such hose sections are shown under each traverse 5. It is also possible as shown at 17' in FIG. 6 to have the hose sections extend transverse to the traverses.

Each of the U-section pressure plates 12 is carried at its ends on rods 13 that extend up through the lower wall of the rectangular box-girder traverse 5 and that are provided at their upper ends with plates 18 that can abut the upper ends of respective upward extending cylindrical projections 19 of this lower wall of the respective traverse 5. This structure allows a limited vertical travel A for the plate 12 relative to the traverse 5. Coil springs 14 surround the rods 13 and urge the plates 12 upward. The travel distance A is substantially smaller than the diameter D of the hose sections 17 in unstressed condition as shown in dot-dash lines in FIG. 4. In the machine according to this invention, however, the hose sections 17 are flattened to bear in substantial surface—not line—contact on the lower surface of the bend compensator 11 and therethrough on the lower surface of the traverse 5 and on the upper surface of the plates 12 and therethrough on the upper surface of the platen 3. In this flattened condition each hose 17 has a cross-sectional area equal to about 75% of its area when uncompressed and of circular cross section as indicated in dot-dash lines in FIG. 4.

Figure 3:
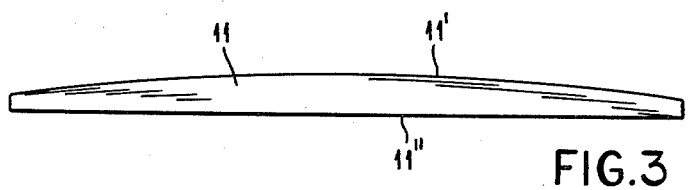
FIG. 3 is a side view of the bend compensator of this invention.

The bend compensator 11 shown in FIG. 3 has a curved upper side 11' and a planar lower side 11". The curvature of the upper side 11' is such that when the press is fully loaded, producing the bend line 10, the compensator 11 becomes lens-shaped and cancels out the traverse curvature. This compensator 11 is normally formed as a single incompressible metallic element, but may be laminated or formed of several independent elements to adjust for different pressures.

In order to press a belt the nuts 9 are screwed down to allow only a small play between the belt 1 and the confronting lower and upper surfaces of the platens 3 and 4, respectively. The source 16 then pressurizes the hoses 17 so as to force the upper platen 3 down. This action bows the traverses as indicated at 10. Since the compensator 11 has a similar bow, however, this bowing is irrelevant and even pressure will be exerted over the entire platen surface. The pressure being exerted can be read on manometers or gauges 16 (FIG. 1) which will give an exact pressure reading either for the pressure at the respective traverse, if only the hoses 17 of a single traverse are connected together, or of the whole press, if all the hoses 17 are connected together.

Thus the system according to the instant invention will perfectly uniformly apply pressure to the upper press platen. Even if the mechanical actuating means constituted by the tie rods 8 and nuts 9 is not carefully adjusted, the equal pressurization of all the hoses 17 by the source 16 will uniformly distribute the pressure over the entire platen upper surface. The compensator 11 completely cancels out the bending in the traverses, so that extra force need not be applied at the traverse center as in the prior-art systems.

I claim:

1. A belt press comprising:

a plurality of upper and a plurality of lower traverses respectively having lower and upper traverse faces;

respective upright tie bolts extending vertically between said upper and lower traverses and securing said lower traverses to the respective upper traverses;

upper and lower press platens carried on and between said traverses and having respective upper and lower platen faces respectively confronting said lower and upper traverse faces;

hydraulic actuating means for displacing said traverses toward each other and thereby pressing said platens against a belt engaged therebetween, said means being engaged between one of said platen faces and the confronting traverse face and having a pressure plate bearing on said one platen face, a plurality of diametrically compressible but circumferentially unstetchable hydraulic hoses forming at least one substantially closed chamber and bearing in one direction in surface contact on said pressure plate and in the opposite direction in surface contact at least indirectly on said confronting traverse face, said hoses having in uncompressed condition a predetermined hose diameter but being partially flattened between said plate and said confronting traverse face, and means for pressurizing said chamber;

means for displacement of said plate toward and away from said confronting traverse face only through a distance substantially shorter than said diameter; and at least one bend-compensating element having a pair of nonparallel upper and lower surfaces and engaged between said hydraulic actuating means and one of the respective faces.

2. The belt press defined in claim 1 wherein the cross-sectional area of said hoses in said actuating means is equal to between 70% and 80% of the cross-sectional area of said hoses in uncompressed condition.

3. The belt press defined in claim 1 wherein said hoses are all interconnected to form a single such chamber.

4. The belt press defined in claim 2 wherein said hoses extend transverse to said traverses.

5. The belt press defined in claim 2 wherein said hoses extend generally parallel to said traverses and are aligned thereunder.

6. The belt press defined in claim 5 wherein said hoses of each of said plates engage each other laterally.

7. The belt press defined in claim 1 wherein said plate is of thermally insulating material.

8. The belt press defined in claim 1, further comprising a pressure gauge for indicating the pressure in said chamber.

9. The belt press defined in claim 1 wherein said hoses are normally of circular cross section and are formed of a filament-reinforced elastomer.

10. The belt press defined in claim 1 wherein each of said plates is of U-section and laterally contains the respective hoses.

* * * * *